US009197258B1

(12) United States Patent
Menkhoff et al.

(10) Patent No.: US 9,197,258 B1
(45) Date of Patent: Nov. 24, 2015

(54) SYSTEM AND METHOD FOR GENERATING A DATA DEPENDENT CLOCK FOR A DAC IN A MODULATOR (71) Applicant: Intel IP Corporation, Santa Clara, CA (US)

(72) Inventors: Andreas Menkhoff, Oberhaching (DE); Michael Bruennert, Unterhaching (DE); Markus Schimper, Moosinning (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/303,945

(22) Filed: Jun. 13, 2014

(51) Int. Cl.
*H04B 1/04* (2006.01)
*H04L 27/20* (2006.01)

(52) U.S. Cl.
CPC .............. *H04B 1/0475* (2013.01); *H04L 27/20* (2013.01)

(58) Field of Classification Search
CPC ............ H04L 27/0008; H04L 27/2017; H04L 27/2032; H04L 27/36; H04L 27/361; H04L 27/367; H04L 27/20; H04B 1/0483; H04B 2001/0491; H04B 1/0475; H03F 3/24

USPC ......... 375/295, 296, 300, 302; 455/91, 114.2, 455/114.3
See application file for complete search history.

(56) References Cited

U.S. PATENT DOCUMENTS

| 8,076,977 | B2 | 12/2011 | Menkhoff | |
|---|---|---|---|---|
| 2009/0258612 | A1* | 10/2009 | Zhuang et al. | 455/110 |
| 2009/0311972 | A1* | 12/2009 | Husted et al. | 455/76 |
| 2010/0111222 | A1* | 5/2010 | Schimper et al. | 375/296 |
| 2012/0119931 | A1 | 5/2012 | Menkhoff et al. | |

* cited by examiner

*Primary Examiner* — Vineeta Panwalkar
(74) *Attorney, Agent, or Firm* — Eschweiler & Associates, LLC (57) ABSTRACT

A modulator and associated method includes a calculation block configured to receive a plurality of digital samples of a modulated baseband signal, and determine time instances associated with predetermined phase crossings of the modulated baseband signal. The modulator further includes a converter circuit configured to generate a data dependent clock signal having rising and falling edges associated with the determined time instances, and a digital to analog converter configured to receive the data dependent clock signal and generate a square wave output signal having transition times associated with the generated data dependent clock signal.

21 Claims, 10 Drawing Sheets

SYSTEM AND METHOD FOR GENERATING A DATA DEPENDENT CLOCK FOR A DAC IN A MODULATOR

BACKGROUND

Polar modulators for wireless transceivers offer a few benefits for implementation compared to conventional I/Q transceivers, such as lower current consumption due to a lower peak to average amplitude ratio and half clock local oscillator (LO) distribution. Polar modulators also exhibit no counter intermodulation, and higher output power is possible since a polar modulator is less sensitive to re-modulation. Further, with a polar modulator there is no limitation to support a wider signal bandwidth that is required for digital pre-distortion.

The polar modulator concept separates the modulation signal into an amplitude modulation (AM) signal and a phase modulation (PM) signal. The symbols or points used in polar modulation correspond or translate from Cartesian coordinates utilized in vector modulation concepts. The polar modulation concept provides power efficiency advantages, among others.

DETAILED DESCRIPTION

The present disclosure includes systems and methods that determine time instances associated with predetermined phase crossings of a modulated baseband signal, and use the predetermined time instances to generate a data dependent clock. The data dependent clock is then employed to clock a digital to analog converter to generate a polar modulator output having timing transitions that correspond to the predetermined phase crossings.

In a polar modulator, received Cartesian signals (i.e., an in-phase (I) and a quadrature (Q) signal), are converted into polar equivalents representing an amplitude portion (R) and a phase portion ($\phi$). The polar signals are then processed, wherein the amplitude signal portion is processed within a digital to analog converter (DAC), and the phase signal portion is processed by some form of time DAC, such as a digitally controlled oscillator (DCO) or a digital to time converter (DTC). Digital clock signals employed in such phase processing, for example, do not provide continuous phase information as there is only information in the rising and falling edges of the digital clock signal.

In the present disclosure, a fixed digital clock signal is employed to sample an RF phase (wherein the RF phase comprises a sum of the phase of the complex baseband signal and the linear phase ramp of the RF carrier frequency signal). The resultant phase samples are then employed to determine time instances associated with a predetermined phase crossing, for example, at integer multiples of 180°. The polar modulator of the present disclosure therefore ascertains the time instances when the RF phase has advanced by integer multiples of 180°, for example.

The output of an analog I/Q modulator can be written as $$y(t) = \text{real}\{e^{j2\pi f_{center}t} \times (I(t) + jQ(t))\},$$

wherein $f_{center}$ is the RF channel frequency, and $I(t)$ and $Q(t)$ are the in-phase and quadrature components of the complex baseband signal. The complex baseband signal can also be written in polar form, wherein $$I(t) + jQ(t) = A(t)e^{j\phi t}.$$

This yields an RF signal of $$y(t) = \text{real}\{e^{j2\pi f_{center}t} A(t)e^{j\phi t}\} = \text{real}\{A(t)e^{j(2\pi f_{center}t + \phi(t))}\} = A(t)\cos(2\pi f_{center}t + \phi(t)).$$

The RF signal will thus have a rising edge zero transition when $2\pi f_{center}t+\phi(t)=3\pi/2+2n\pi$, and a falling edge zero transition will occur at $2\pi f_{center}t+\phi(t)=\pi/2+2n\pi$. The polar modulator of the present disclosure may use the above information to calculate the time instances associated with the phase data occurring at integer multiples of 180°, for example. Alternatively, as will be more fully appreciated below, other predetermined phase crossings may be employed in conjunction with the present disclosure. Such time instances (associated with the predetermined phase crossings) are employed to generate a data dependent clock which is ultimately employed to clock a digital to analog converter that generates the polar modulator output signal. Further, while the examples provided herein address predetermined phase crossings at integer multiples of 180°, the disclosure is not limited to such examples.

Figure 1:
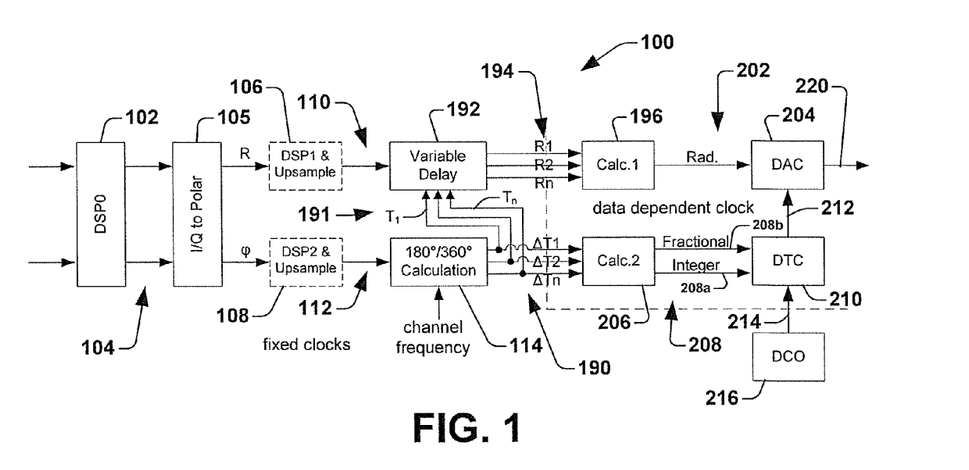
FIG. 1 is a block diagram illustrating a polar modulator according to one example of the disclosure.

Turning now to FIG. 1, a block diagram is provided illustrating a polar modulator 100 according to one example of the present disclosure. The modulator 100 receives input data I and Q in Cartesian coordinates, which undergo various types of optional signal processing in the digital domain, for example, with a processor 102. The processed I/Q values 104 are converted into polar form comprising amplitude samples R[k] and phase samples Q[k] using an I/Q to polar converter 105, such as a coordinate rotation digital computer (CORDIC), for example. Optional processing blocks 106 and 108 in the amplitude and phase paths, respectively, may provide processing such as predistortion and may also provide upsampling such that the resultant digital amplitude samples 110 and phase samples 112 correspond to time instances of a fixed digital clock ($CLK_{fixed}$).

Still referring to FIG. 1, a calculation block 114 receives the digital phase samples 112 and determines time instances associated with a predetermined phase crossing or demarcation and, in this example, integer multiples of 180° with respect thereto. In one particular example, the time instances could be associated with zero crossings of the phase. However, more generally, the calculation block 114 can determine time instances with any predetermined crossing or crossings in the phase data.

Figure 2A:
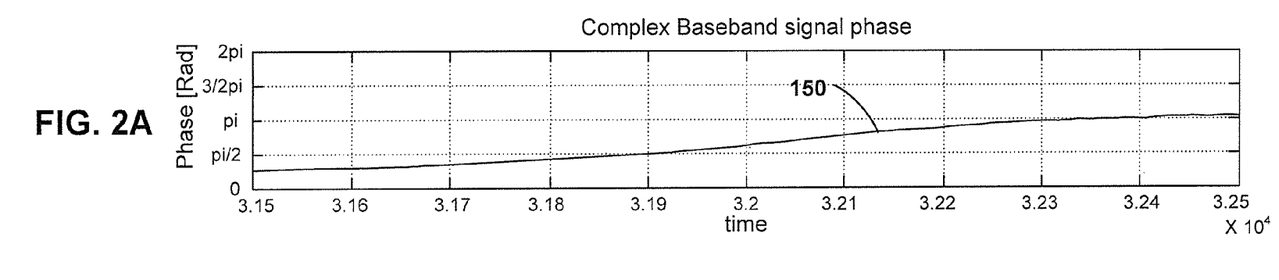
FIGS. 2A-2C are graphs illustrating a continuous baseband phase, a continuous carrier phase, and a continuous combined complex baseband and carrier phase.
Figure 2B:
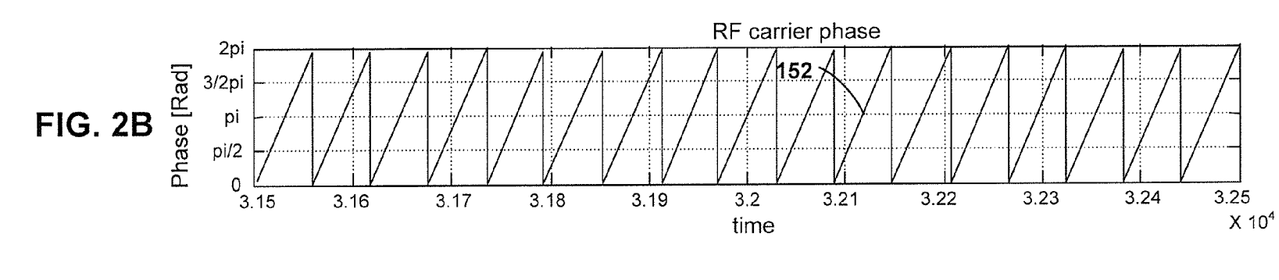
Figure 2C:
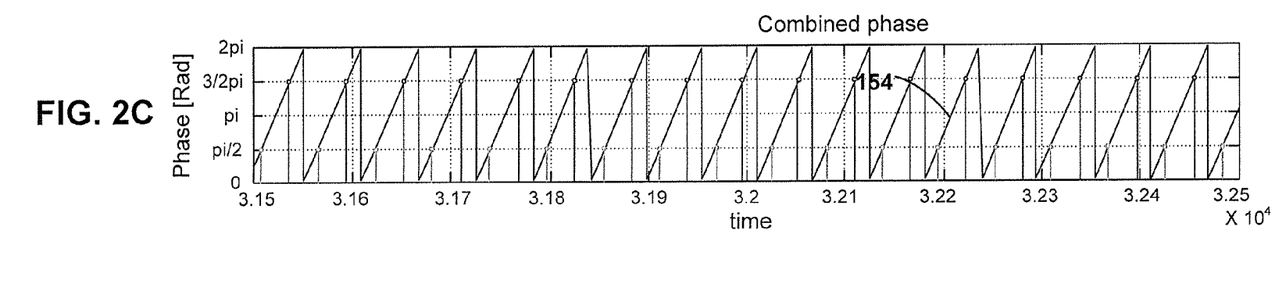

For example, referring to FIGS. 2A-2C, FIG. 2A illustrates a slowly varying baseband phase signal 150, while FIG. 2B illustrates the linear ramp slope of an RF carrier phase signal 152, for example, a sinusoidal signal with a linearly varying phase for each period of 0 to $2\pi$ that then periodically repeats. FIG. 2C illustrates the combined baseband and carrier phase signal 154 (e.g., $2\pi f_{center}t+\phi(t)$), wherein for a cosine function the zero crossings occur at integer multiples of $\pi/2$ and $\pi/2$. Note that since FIG. 2C results in a variation of the carrier phase of FIG. 2B due to the addition of the baseband phase data of FIG. 2A, the timing instances of the zero crossing are not periodic in time and thus do not correspond to the time instances of the digital phase data $\phi[k]$ that correspond to the fixed sampling clock $CLK_{fixed}$.

Now referring back to FIG. 1 in conjunction with FIG. 2C, the calculation block 114 uses the samples $\phi[k]$ 112 that coincide with the fixed data clock $CLK_{fixed}$ to calculate the time instances of the rising and falling zero crossings ($\pi/2$ and $3\pi/2$) of the combined baseband and carrier phase signal 154 for each 360° phase rotation.

Figure 3A:
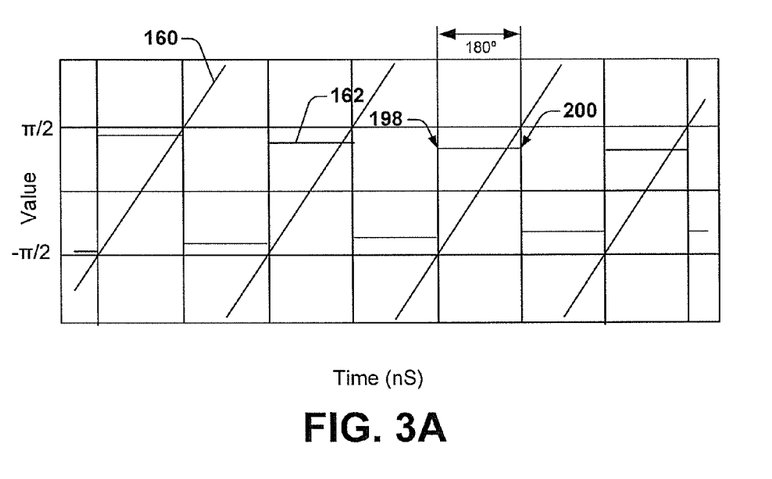
FIG. 3A is a graph illustrating amplitude jumps at predetermined phase crossings that are integer multiples of 180° according to one example of the disclosure.
Figure 3B:
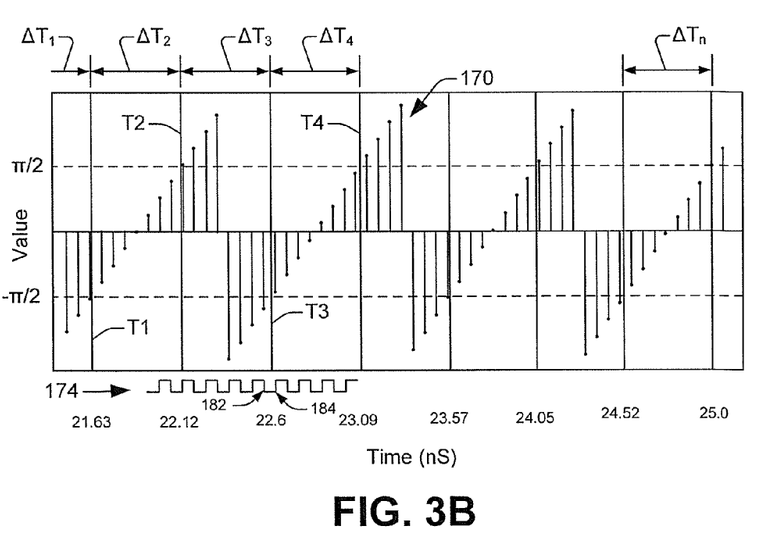
FIG. 3B is a graph illustrating digital phase samples of a combined complex baseband and carrier phase with neighboring samples that straddle a predetermined phase crossing, for example, at integer multiples of 180.°
Figure 3C:
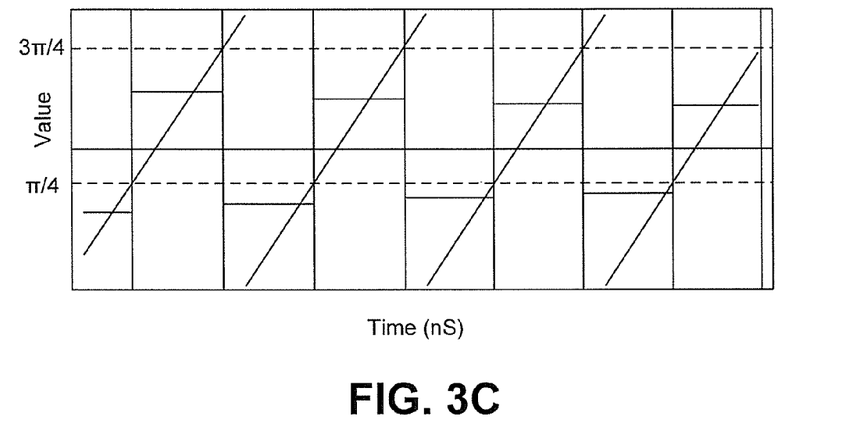
FIG. 3C is graph illustrating amplitude jumps at different predetermined phase crossings than shown in FIG. 3A according to another example of the disclosure.
Figure 3D:
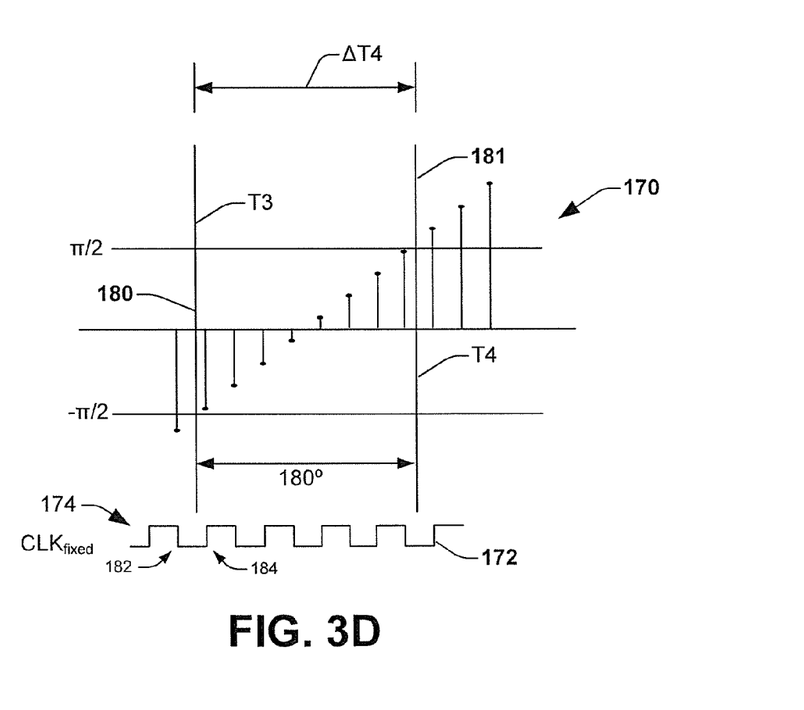
FIG. 3D is a graph showing an exploded view of a portion of FIG. 3B to better illustrate a calculation of a time instance associated with a predetermined phase crossing according to one example of the disclosure.

For example, referring to FIG. 3A, an example of a continuous signal combined baseband and carrier phase signal 160 is illustrated, wherein the amplitude 162 will experience a polar phase jump at $-\pi/2$ and $+\pi/2$, which is every 180° (and which is a different phase crossing than highlighted before). In an actual implementation, FIG. 3B illustrates the digital samples $\phi[k]$ 112 representing the combined baseband and carrier phase signal. In this example, the time instances (T1, T2, ..., Tn) associated with integer multiples of 180°, such $-\pi/2$ and $+\pi/2$ is provided. An enlarged or exploded view of a portion of the digital phase data $\phi[k]$ is illustrated in FIG. 3D, wherein each phase sample 170 corresponds to an edge 172 of the fixed clock 174. Note that due to the baseband phase data on top of the carrier phase, a time instance (T3) 180 associated with the $-\pi/2$ crossing does not correspond to either a rising or falling edge of the fixed clock 174, but instead falls somewhere between a falling edge 182 and a rising edge 184 thereof, wherein the falling edge 182 and the rising edge 184 are associated with known time instances.

In one example, the calculation block 114 calculates the zero crossing time instance (T1, T2, ..., Tn) 180 (e.g., $t_{cross}$) by solving a linear equation. If the time instance associated with a falling edge 182 is t0=22.5625 nS, and it is known that the phase magnitude is Arg0=−1.835409 (which is smaller than $-\pi/2$), and if the time instance associated with a rising edge 184 is t1=22.625 nS, and it is known that the phase magnitude is Arg1=−1.429997 (which is greater than $-\pi/2$), we can calculate the time instance 180 by:

$$(-\pi/2-\text{Arg}0)/(\text{Arg}1-\text{Arg}0)\times(t1-t0)+t0=22.6033 \text{ nS}.$$

With these determined times instances 191, one can readily calculate the time instance differences, for example, wherein $\Delta T2=T2+T1$. Similarly, with regard to the predetermined phase crossing of $\pi/2$ (time instance 181), t0=23.0625 nS and Arg0=1.4145112 (smaller than $\pi/2$) and t1=23.125 nS and Arg1=1.821834 (larger than $\pi/2$). Using the formula, one obtains:

$$(\pi/2-\text{Arg}0)/(\text{Arg}1-\text{Arg}0)\times(t1-t0)+t0=23.0865 \text{ nS}.$$

Other integer multiples of 180°, for example, of such phase crossings may be calculated by the calculation block 114 in a similar manner. Therefore in one example, the calculation block 114 identifies the two phase instances that straddle the predetermined phase crossing or demarcation (as well as 180° integer multiples thereof). In one example, the 180° phase multiples correspond to the zero crossings $\pi/2$ and $3\pi/2$, however, as illustrated in FIG. 3A, the phase crossings may correspond to $-\pi/2$ and $+\pi/2$. Any other predetermined phase relationship may be employed and is contemplated as falling within the scope of the present disclosure. For example, as illustrated in 3C, the phase crossing may be $\pi/4$ and $3\pi/4$, respectively. Any such predetermined phase crossing and 180° integer multiple thereof is contemplated by the present disclosure. Again, while the examples herein employ 180° integer multiples, the present disclosure is not so limited.

Thus as can be seen in FIGS. 1 and 3B, the calculation block 114 outputs a calculated difference 190 in the time instances $T_1, T_2, ..., T_n$, wherein the difference $\Delta T1=T2+T1$, $\Delta T2=T3-T2$, etc. associated with the combined baseband and carrier phase signal 112 crossing the predetermined phase crossing or demarcation plus 180° integer multiples thereof. Alternatively, the calculation block 114 may solve a quadratic equation, such as:

$$[a-c\pm[(c-a)^2-8b(a-2b+c)]^{1/2}]/4(a-2b+c),$$

wherein "b" is the closest sample time instance to the phase crossing, "a" is the preceding sample time instance, and "c" is the successive sample time instance. Other calculation schemes may further be employed by the calculation block 114 to calculate the time instances, and all such alternatives are contemplated as falling within the scope of the present disclosure.

Figure 4A:
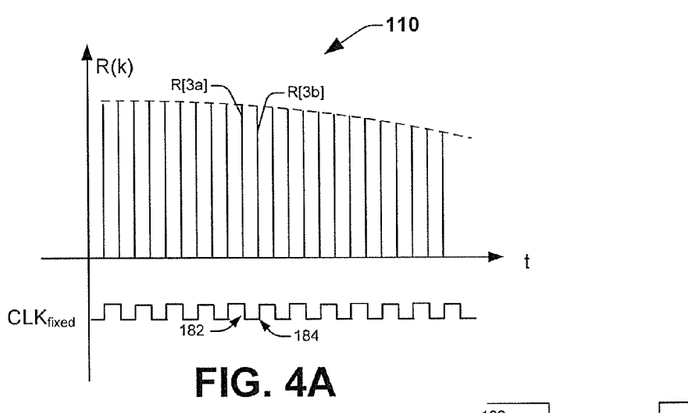
FIG. 4A is a graph illustrating a plurality of amplitude samples associated with edges of a fixed clock.
Figure 4B:
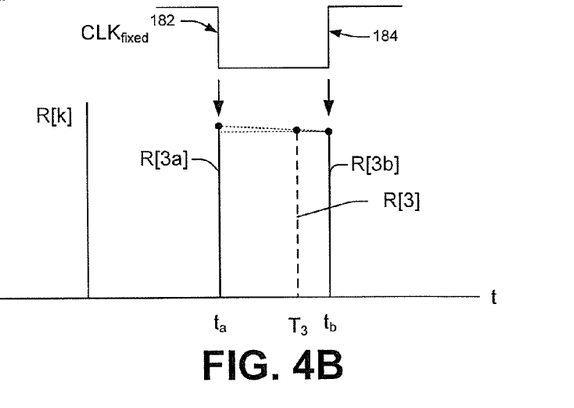
FIG. 4B is a graph illustrating an exploded view of a portion of the graph in FIG. 4A, wherein amplitude values associated with edges of a fixed clock that straddle a determined time instance are employed to interpolate a digital amplitude value associated with the determined time instance.

Referring back to FIG. 1, while the calculation block 114 outputs the determined differences in the time instances 190, the calculation block 114 provides the actual time instances 191 (T1, T2, . . . Tn) to a variable delay block 192 that operates as an interpolator. The variable delay block 192 receives the digital amplitude values R[k] 110 and uses the determined time instances 191 to obtain interpolated digital amplitude values $R_1, R_2, \ldots R_n$ 194 that are synchronized with the determined time instances 191. For example, as illustrated in FIG. 4A, a plurality of amplitude samples R[k] 110 are input into the variable delay block 192, wherein each of the samples coincide with an edge of the fixed clock ($CLK_{fixed}$). As illustrated FIG. 3B, the time instance $T_3$ falls between edges 182 and 184 of the fixed clock, and FIG. 4A illustrates two amplitude values R[3a] and R[3b] at the same edges. In order to ascertain the amplitude value associated with the time instance $T_3$ that occurs between the edges 182 and 184 of the clock, an interpolation, for example, a linear interpolation, may be performed as illustrated in greater detail in FIG. 4B. In this case the time instances 191 are known and the amplitude values are known, thus since the time instance $T_3$ has been calculated, the interpolated amplitude R[3] can be readily determined.

Figure 5:
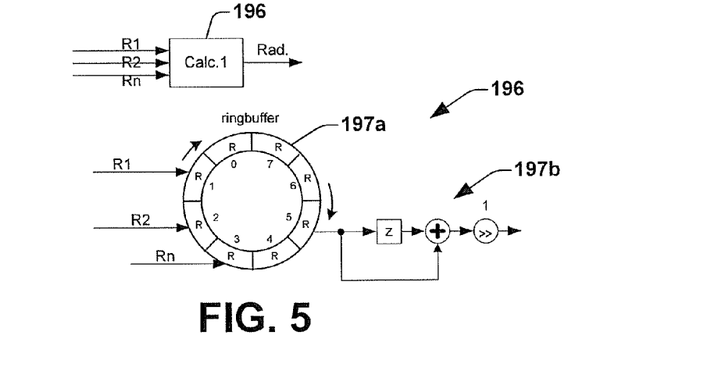
FIG. 5 is a schematic diagram illustrating a first processing circuit according to one example of the disclosure.

The interpolated amplitude values $R_1, R_2, \ldots R_n$ 194 are then forwarded to a first processing circuit 196, which then employs the interpolated values to generate a single amplitude value for each 180 phase period. Note that in FIG. 3A, for example, the amplitude for each 180 phase period is a single value, yet the interpolated values 194 represent a value of the phase at multiple time instances 191, wherein a first time instance is associated with a beginning of a 180° phase period (see reference numeral 198 in FIG. 3A), while the next interpolated value 194 represents the value of the phase at the next time instance which is associated with the end of that 180° phase portion (see reference numeral 200 in FIG. 3A). Since the amplitude during that 180° phase duration is to be a single value, the first processing circuit 196 calculates a single amplitude value using the two interpolated values (e.g., R1 and R2, or R2 and R3, etc.). In one example illustrated in FIG. 5, the first processing circuit 196 includes a ring buffer 197a, wherein the interpolated amplitude values are input according to a first domain (e.g., according to the fixed clock), and the values are retrieved therefrom according to a second clock domain (e.g., the data dependent clock domain). The amplitude values exit the ring buffer 197a and enter an arithmetic circuit 197b, wherein two successive amplitude values are added, following by a shift by 1, which corresponds to a divide by two operation. Thus output value from the first processing circuit 196 are equivalent to: (R1+R2)/2, (R2+R3)/2, . . . . Thus the first processing circuit 196 generates a single amplitude value for the given 180° phase duration using interpolation or other type processing. The first processing circuit 196 repeats this operation for each of the pairs of interpolated amplitude values to generate a series of amplitude values 202 that form the digital input data to the digital to analog converter (DAC) 204 of FIG. 1.

Returning to FIG. 1, the calculated time instance differences 190 (e.g., ΔT2=T2−T1) output from the calculation block 114 are input to a second processing circuit 206 which takes the time instance differences and generates a control signal 208 having, in one example, an integer portion 208a and a fractional portion 208b. The control signal 208 is then provided to a digital to time converter (DTC) 210 that generates a clock signal 212 that is a data dependent clock signal, since the clock 212 has edge transitions that correspond to the determined time instance differences 190 output from the calculation block 114.

Figure 6:
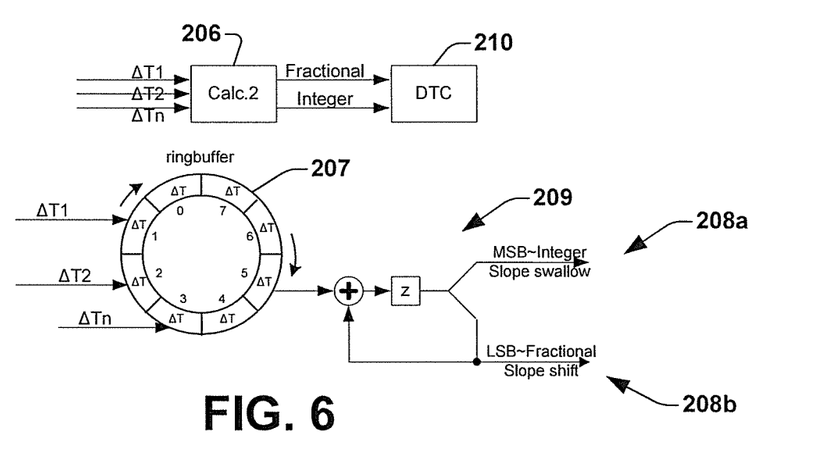
FIG. 6 is a schematic diagram illustrating a second processing circuit according to another example of the disclosure.

Referring to FIG. 6, in one example the second processing circuit 206 includes a ring buffer 207 followed by an integrator circuit 209. The determined time instance differences are input to the ring buffer 207 according to the first clock domain and exit according to the second clock domain, and the integrator 209 feeds back the least significant bit (LSB) such that the fractional samples accumulate with LSB overflow. Thus in one example the DTC may select 5 integer samples and a ⅓ fractional sample, and then next select 5 integer samples and a ⅔ fractional sample, followed by 6 integer samples with zero fractional samples. This is an example of a generated clock without any complex phase data. The complex phase data will cause the number of integer samples, fractional samples, or both, to change.

Figure 7:
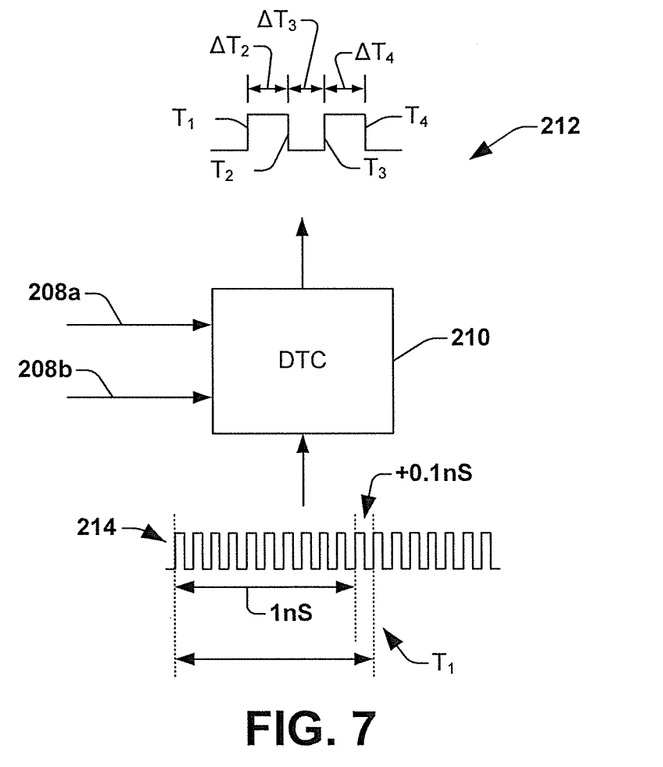
FIG. 7 is a block diagram illustrating a digital to time converter (DTC) that receives a control signal and a high frequency clock and outputs rising and falling edges that form a data dependent clock according to one example of the disclosure.

In one example, the DTC 210 of FIG. 7 receives a high frequency clock 214 from an oscillator circuit 216, for example, a digitally controlled oscillator (DCO). In one example, the high frequency clock is a sufficiently high frequency such that selected edges thereof may be selected by the DTC 210 and passed along as a constructed data dependent clock 212 for subsequent use by the DAC 204. For example, if the channel frequency is 1 GHz, the period of a fixed clock would be 1 nS. If the first determined time instance T1 fell at 1.1 nS, for example, due to the complex baseband phase information, the integer portion 208a of the control signal 208 may inform the DTC 210 to take one of every 10 periods of the DCO clock 214 (if the DCO clock is 10× the channel frequency), while the fractional portion 208b of the control signal 208 would inform the DTC to then move 1 further clock period (0.1 nS) of the DCO clock 214 and select that edge for passing on as an edge of the data dependent clock 212. Similarly, if the next timing instance T2 fell at 0.9 nS later, for example, due to the complex baseband phase information, the integer portion 208a of the control signal may stay the same and the fractional portion 208b may indicate a negative 0.1 nS. These are simply examples to help appreciate that the time instance differences 190 of the calculation block 114 are employed to generate a control signal 208 that is utilized by the DTC 210 to select particular edges of high frequency DCO clock 214 in order to construct a clock 213 that is data dependent and not a fixed clock. That is, the data dependent clock 212 has edges that correspond in time to the time instances output from the calculation block 114 that correspond to 180° phase periods. Any alternative control and data dependent clock circuitry may also be employed and is contemplated as falling within the scope of the present disclosure.

Figure 8:
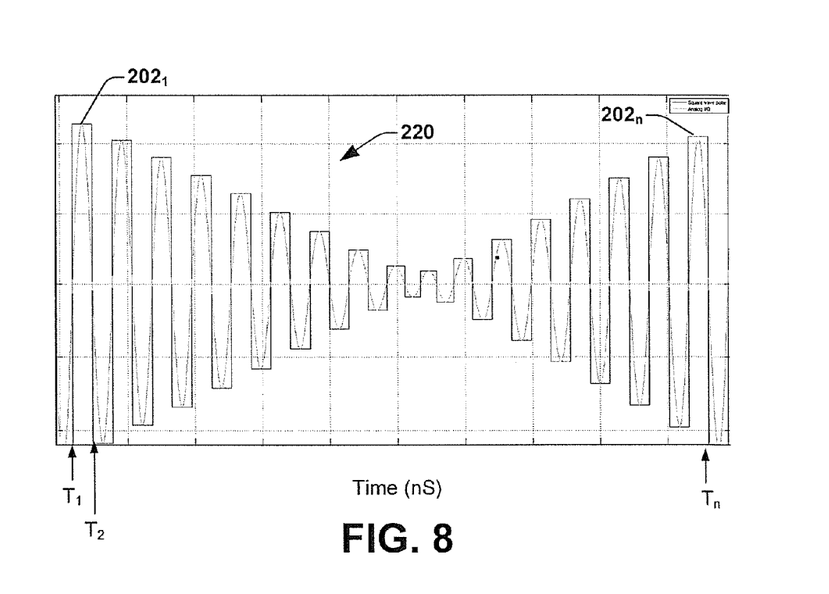
FIG. 8 is a graph illustrating a square wave output waveform having transitions that correspond to the determined time instances associated with predetermined phase crossings and an amplitude associated with the amplitude data synchronized with the determined time instances according to one example of the disclosure.

The data dependent clock 212 is then employed to clock the digital to analog converter (DAC) 204. The DAC 204 then outputs a square wave output signal 220 having transition times associated with the generated data dependent clock 212 and having an amplitude that corresponds to the processed amplitude data 202 input to the DAC 204 which synchronized to the transition times via the processing in the variable delay circuit 192 and the first processing circuit 196. An example of the output signal 220 is illustrated in FIG. 8, wherein a timing of the transitions of the square wave correspond to the determined time instances $T_1, T_2, \ldots T_n$ and the amplitudes $202_1$-$202_n$ correspond to the processed amplitude data that is synchronized with respect to the time instances.

Figure 9:
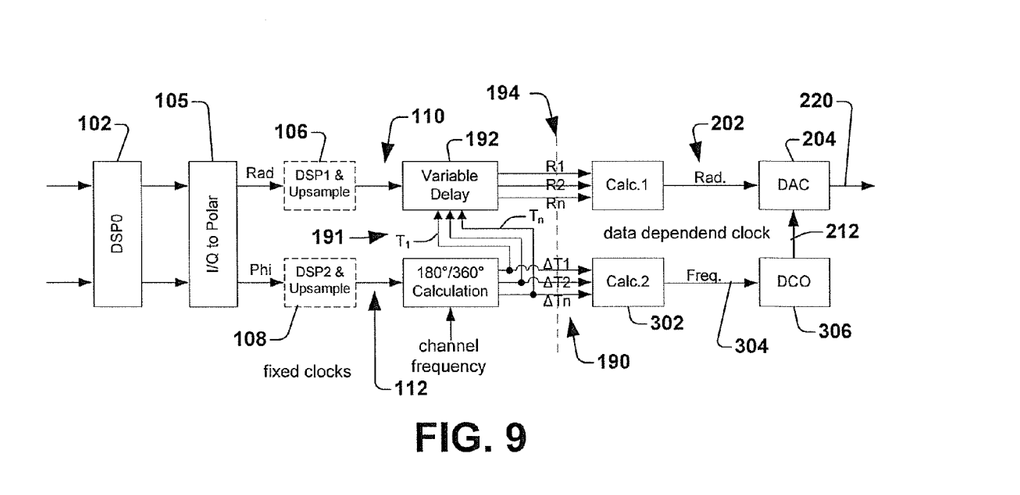
FIG. 9 is a block diagram illustrating a polar modulator according to another example of the disclosure.

FIG. 9 is a block diagram illustrating a polar modulator 300 according to another example of the disclosure. To the extent the polar modulator 300 of FIG. 7 has similar components and functionality to components in the polar modulator 100 of FIG. 1, similar reference numerals are employed and a discussion of such components is omitted for the sake of brevity. In the polar modulator 300 of FIG. 7, the time instance differences $\Delta T_1, \Delta T_2, \ldots \Delta T_n$ 190 determined by the calculation block 114 are forwarded to a frequency calculation circuit 302 that ascertains a period that corresponds to each particular time instant difference (or time between successive time instances), calculates a frequency associated therewith, and outputs a frequency control signal 304 based thereon. The frequency control signal 304 serves as a control input to the DCO 306 which then alters a frequency of its output signal such that the edges of the output signal 212 correspond to the determined time instance differences 190. Thus the DCO 306 outputs a data dependent clock signal 212 that serves to clock the DAC 204 in a manner similar to that discussed above.

Figure 10:
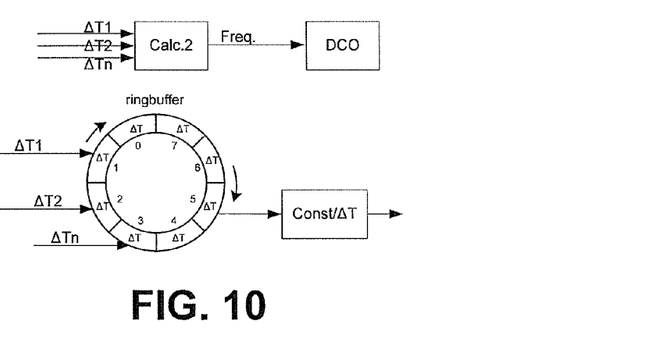
FIG. 10 is a schematic diagram illustrating a second processing circuit according to the example modulator illustrated in FIG. 9.

FIG. 10 is a schematic diagram illustrating the second processing circuit 302 of FIG. 9 according to one example. The second processing circuit 302 comprises a ring buffer 303 that receives the determined instance differences 190 according to the first clock domain and outputs the time instance differences 190 according to the second clock domain. The output time instance differences 190 are delivered to a processing block 305 that divides a normalization constant by the time instant to calculate a frequency associated therewith, which is forwarded to the DCO 306.

Figure 11:
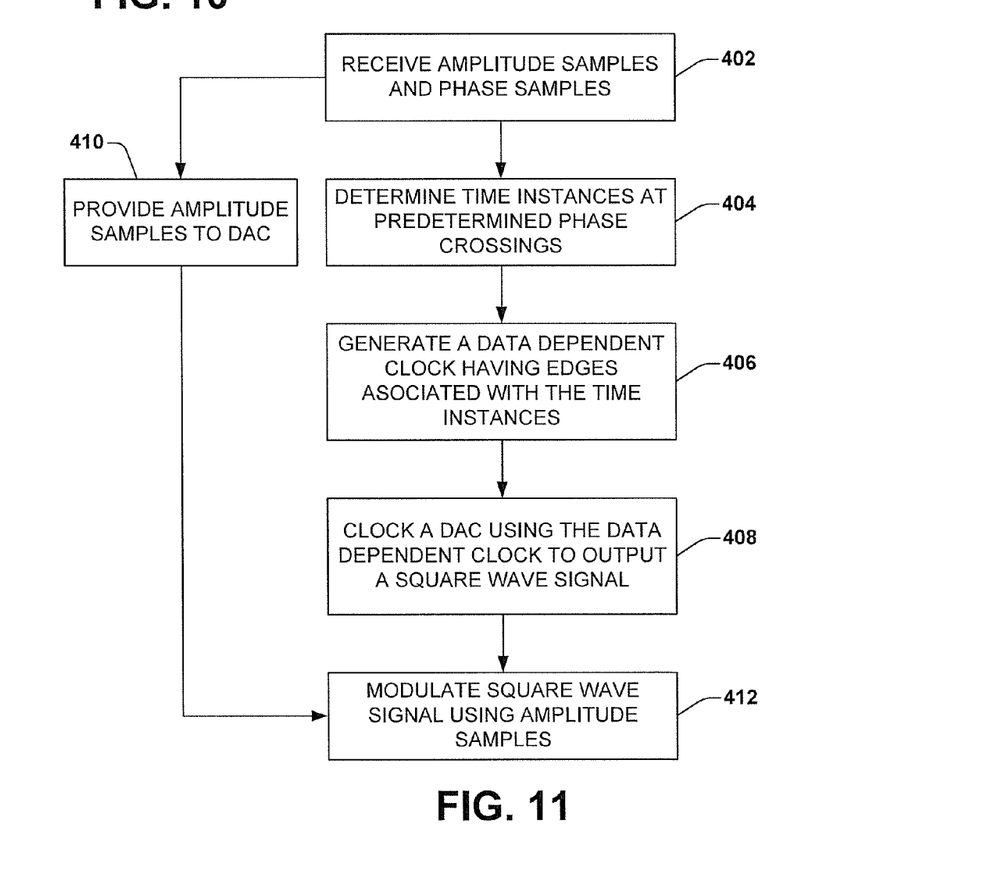
FIG. 11 is a flow chart illustrating a method of generating a polar modulator output signal using a data dependent clock according to one example of the disclosure.

The present disclosure also relates to a method 400, as illustrated in FIG. 11. In one example, the method 400 comprises receiving a plurality of digital samples at 402, wherein the digital samples comprise a plurality of digital amplitude samples and a plurality of digital phase samples, wherein the plurality of digital phase samples comprise digital samples of a combined baseband and carrier phase. The method 400 further comprises determining time instances associated with predetermined phase crossings (e.g., at integer multiples of 180°, but not limited thereto) of the modulated baseband signal at 404. In one example such time instances correspond to the instances 190 determined by the calculation block 114 of FIG. 1, however, the method 400 is not limited to such an example.

Still referring to FIG. 11, the method 300 continues at 306 by generating a data dependent clock having rising and falling edges associated with the determined time instances. Non-limiting examples of such acts may be found with the converter circuits 206, 210 and 216 of FIG. 1, and the converter circuits 302 and 306 of FIG. 7. Further, the method 400 comprises clocking a digital to analog converter (DAC) using the generated data dependent clock signal at 408. The output of the DAC comprises a square wave output signal having transition times associated with the generated data dependent clock.

The method 400 may further comprise, in one example, providing the amplitude samples to the DAC and then modulating the square wave output signal at 412 using the amplitude samples.

Figure 12:
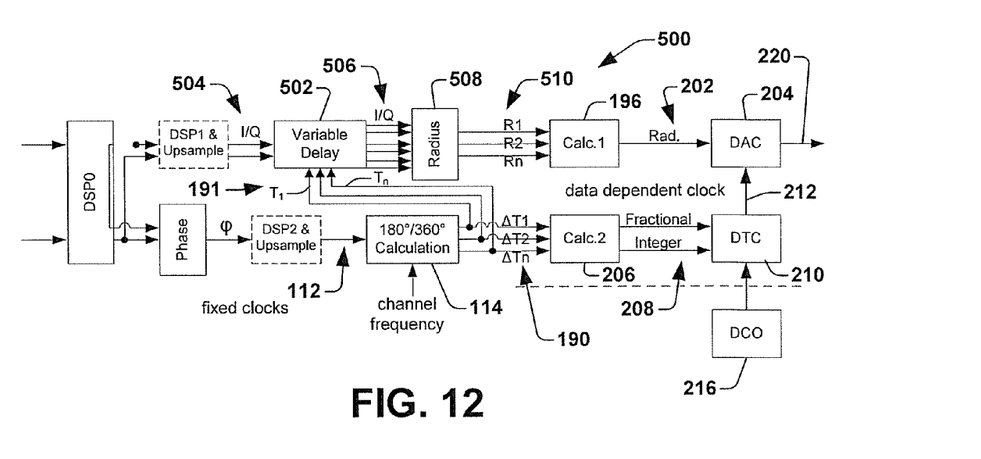
FIG. 12 is a block diagram illustrating a polar modulator according to another example of the disclosure.

Turning now to FIG. 12, another modulator 500 is illustrated, wherein the digital phase samples 112 are still processed by the calculation block 114 to generate the calculated time instance differences 190 and the time instances 191. However, instead of using the time instances 191 to interpolate amplitude samples so as to generate amplitude samples that are synchronized with respect to the time instances, a variable delay circuit 502 receives in-phase (I) and quadrature (Q) digital samples 504 and uses the time instances 191 to interpolate the I/Q data 504 to generate interpolated I/Q data 506. The interpolated I/Q data 506 is then forwarded to a converter 508 such as a CORDIC to generate amplitude values 510 that are interpolated and synchronized to the respective time instances 191. The other modulator components work, in one example, in the same manner as described earlier with respect to FIG. 1 to generate the square wave output signal 220 having transitions associated with the data dependent clock 212.

Figure 13:
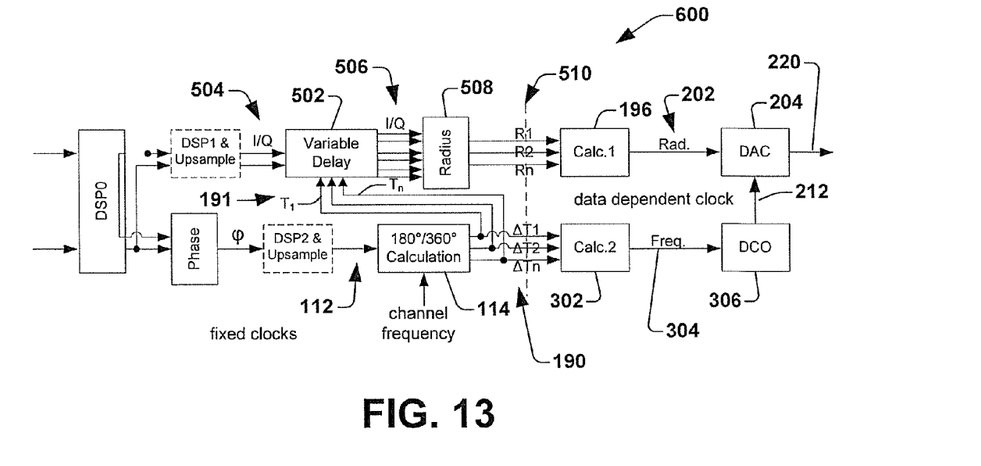
FIG. 13 is a block diagram illustrating a polar modulator according to another example of the disclosure.

FIG. 13 illustrates a modulator 600 according to another example. In this example, the I/Q samples are interpolated using the time instances 191 in the same manner described above with respect to FIG. 12. The difference is that the conversion circuits 302 and 306 use the time instance differences 190 to calculate a frequency and a frequency control signal 304 in order to generate the data dependent clock 212 as previously discussed in conjunction with FIG. 9.

Figure 14:
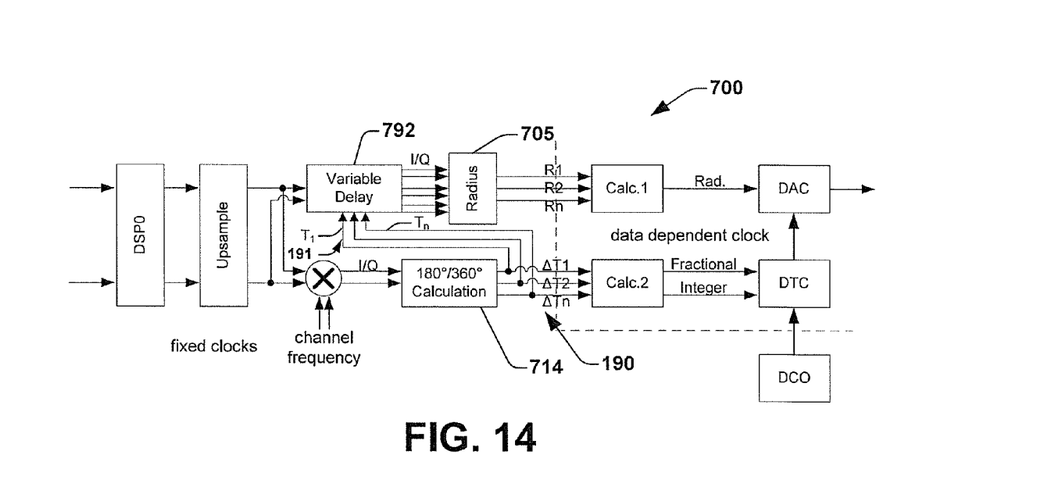
FIG. 14 is a block diagram illustrating a modulator that identifies predetermined phase crossings in an I/Q domain according to one example of the disclosure.

FIG. 14 is a block diagram illustrating another modulator 700, wherein the calculation of time instances and time instance differences associated with predetermined phase crossings is performed with I/Q data samples instead of with the phase samples, as discussed previously in conjunction with FIG. 1. In the I/Q domain we can establish a predetermined phase crossings and 180° integer multiples thereof, for example, in a variety of ways, and all such alternatives are contemplated by the present disclosure. For example, we can establish predetermined phase crossings for every time the in-phase (I) data is zero (0) which corresponds to crossings of the Q axis, which corresponds to phases of 90° and 270°, respectively. Alternatively, one can select phase crossing for every time the quadrature (Q) data is zero (0) which corresponds to crossings of the I axis, or phases of 0° and 180°. Further, one can select phase crossings for every time the I and Q data are equal (in absolute value terms), which corresponds to phases of 45° and 225°, or 135° and 315°, respectively. Using these relationships, for example, when these predetermined phase crossings are identified via the I/Q data samples, the data I/Q samples that straddle such crossing can be identified and used to calculate time instance differences 190 associated therewith.

For example, in a manner analogous to the discussion of FIGS. 3B and 3D, for the same predetermined phase crossings ($-\pi/2$ and $+\pi/2$), the calculation block 714 can calculate the time instances in the I/Q domain as follows: at t0=22.5625 nS, we calculate Re0=−0.326506 and Im0=−1.20497, and at t1=22.625 nS, we calculate Re1=0.173612 and Im1=−1.22488. From these values, we calculate the time instance as follows:

$$Re0/(Re0-Re1) \times (t1-t0) + t0 = 22.6033 \text{ nS}.$$

At the next predetermined phase crossing, we have the following: at t0=23.0625 nS, we calculate Re0=0.181111 and Im0=1.1494, and at t1=23.125 nS, we calculate Re1=−0.28665 and Im1=1.11776. From this data we calculate the time instance as follows:

$$Re0/(Re0+Re1) \times (t1-t0) + t0 = 23.0867 \text{ nS}.$$

With these time instances 191, one can calculate time instance differences 190.

Still referring to FIG. 14, the calculation block 714 sends the calculated time instances 191 to a variable delay block 792 which operates like an interpolator to synchronize the incoming I/Q data to the calculated times instances. The interpolated, or synchronized, I/Q data is then converted into amplitude data by a CORDIC type converter 705. The rest of the modulator 700 operates in a manner similar to the modulator 100 described in FIG. 1 and other corresponding figures.

Figure 15:
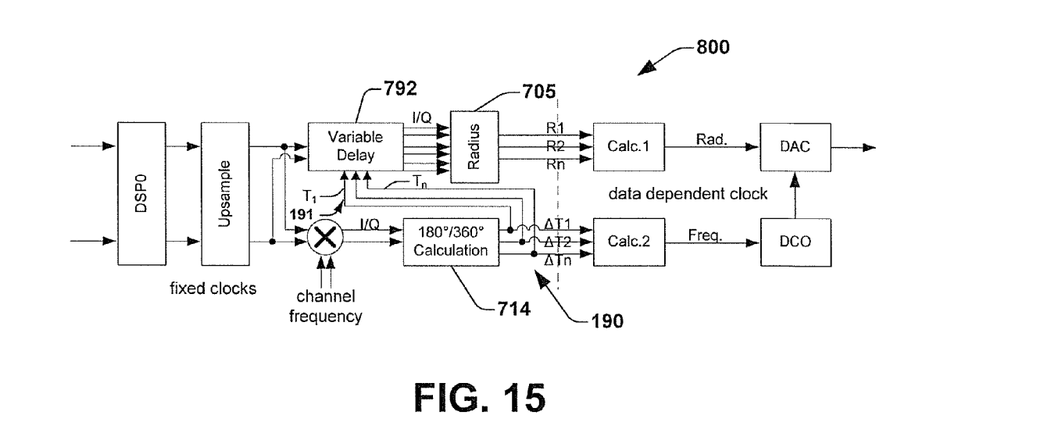
FIG. 15 is a block diagram illustrating a modulator that identifies predetermined phase crossings in an I/Q domain according to another example of the disclosure.

FIG. 15 illustrates yet another example of a modulator 800 that employs a calculation block 714 as described above with respect to FIG. 14 to calculate the time instances 191 and time instance differences 190 in the I/Q domain, and then synchronize the I/Q data samples to the time instances via the variable delay block 792. The CORDIC type converter 705 then converts the synchronized I/Q data to synchronized amplitude samples, and the remaining portion of the modulator 800 operates similar to that described above in FIG. 9

In one example of the disclosure, a method comprises receiving a plurality of digital samples of a modulated baseband signal, and determining time instances associated with predetermined phase crossings of the modulated baseband signal. The method further comprises generating a data dependent clock signal having rising and falling edges associated with the determined time instances and clocking a digital to analog converter using the generated data dependent clock signal, wherein a square wave output signal from the digital to analog converter comprises transition times associated with the generated data dependent clock signal.

In one example of the method, the modulated baseband signal comprises a plurality of in-phase (I) digital samples and a plurality of quadrature (Q) digital samples. In another example of the method the modulated baseband signal comprises a plurality of digital amplitude samples and a plurality of digital phase samples, wherein the plurality of digital phase samples comprise digital samples of a combined baseband and carrier phase.

In one example of the disclosure, a method comprises receiving a plurality of digital amplitude samples and a plurality of digital phase samples, wherein the plurality of digital phase samples comprise digital samples of a combined baseband and carrier phase, and determining time instances associated with predetermined phase crossings of the combined baseband and carrier phase. The method further comprises generating a data dependent clock signal having rising and falling edges associated with the determined time instances and clocking a digital to analog converter using the generated data dependent clock signal, wherein a square wave output signal from the digital to analog converter comprises transition times associated with the generated data dependent clock signal.

In another example the method further comprises providing the plurality of digital amplitude values to the digital to analog converter and modulating a magnitude of the square wave output signal based on the plurality of digital amplitude values.

In another example of the disclosure, the method further comprises interpolating the plurality of digital amplitude samples based on the determined time instances to generate a plurality of interpolated digital amplitude samples representing amplitude values corresponding to the predetermined phase crossings of the combined baseband and carrier phase, providing the plurality of interpolated digital amplitude samples to the digital to analog converter, and modulating a magnitude of the square wave based on the plurality of interpolated digital amplitude samples.

In another example of the method, determining the time instances associated with the predetermined phase crossings comprises identifying neighboring digital samples of the combined baseband and carrier phase that straddle a predetermined phase crossing, ascertaining time instances of a fixed digital clock signal associated with the identified neighboring samples, and using the ascertained time instances of the digital clock to determine the time instances associated with the predetermined phase crossings.

In another example of the method, using the ascertained time instances of the fixed digital clock signal comprises solving a linear equation based on the ascertained time instances.

In another example of the method, generating the data dependent clock signal comprises calculating time instance differences from the determined time instances associated with the predetermined phase crossings and generating a control signal based on the received determined time instance differences associated with the predetermined phase crossings.

In another example of the method, generating the data dependent clock signal further comprises receiving a digital signal having a frequency substantially greater than a frequency of the data dependent clock signal and selectively selecting rising and falling edges of the digital signal based on the control signal, wherein the selected rising and falling edges form the data dependent clock or are used to construct the data dependent clock.

In another example of the method, the control signal comprises an integer portion and a fractional portion.

In one example, a modulator is disclosed and comprises a calculation block configured to receive a plurality of digital samples of a modulated baseband signal, and determine time instances associated with predetermined phase crossings of the modulated baseband signal. The modulator further comprises a converter circuit configured to generate a data dependent clock signal having rising and falling edges associated with the determined time instances, and a digital to analog converter configured to receive the data dependent clock signal and generate a square wave output signal having transition times associated with the generated data dependent clock signal.

In one example of the modulator, the samples of the modulated baseband signal comprise a plurality of in-phase (I) digital samples and a plurality of quadrature (Q) digital samples. In another example of the modulator the samples of the modulated baseband signal comprises a plurality of digital amplitude samples and a plurality of digital phase samples, wherein the plurality of digital phase samples comprise digital samples of a combined baseband and carrier phase.

In another example, a polar modulator is disclosed, and comprises a calculation block configured to receive a plurality of digital phase samples, wherein the plurality of digital phase samples comprise digital samples of a combined baseband and carrier phase, and determine time instances associated with predetermined phase crossings of the combined baseband and carrier phase. The modulator further comprises a converter circuit configured to generate a data dependent clock signal having rising and falling edges associated with the determined time instances, and a digital to analog converter configured to receive the data dependent clock signal and generate a square wave output signal having transition times associated with the generated data dependent clock signal.

In another example of the polar modulator, the digital to analog converter is further configured to receive a plurality of digital amplitude values and modulate a magnitude of the square wave output signal based on the plurality of digital amplitude values.

In one example of the polar modulator, the polar modulator further comprises an interpolator circuit configured to receive a plurality of digital amplitude values and the determined time instances from the calculation block and generate a plurality of interpolated digital amplitude values based on the plurality of digital amplitude values and the determined time instances.

In one example of the polar modulator, the digital to analog converter is further configured to receive the plurality of interpolated digital amplitude values and modulate a magnitude of the square wave output signal based on the plurality of interpolated digital amplitude values.

In one example of the polar modulator, the calculation block is further configured to identify neighboring digital phase samples that straddle a predetermined phase crossing and determine the time instances associated with the predetermined phase crossings based on the identified neighboring digital phase samples.

In one example of the polar modulator, the calculation block is configured to determine the time instances associated with the predetermined phase crossings by ascertaining time instances of a fixed digital clock signal associated with the identified neighboring digital phase samples, and use the ascertained time instances of the fixed digital clock signal to determine the time instances associated with the predetermined phase crossings.

In one example, the polar modulator further comprises a phase processing circuit configured to receive the time instances associated with the predetermined phase crossings, calculate time instance differences based on the time instances, and generate a control signal based on the calculated time instance differences.

In one example of the polar modulator, the converter circuit is configured to receive a digital signal having a frequency substantially greater than a frequency of the data dependent clock signal and the control signal, and selectively select rising and falling edges of the digital signal based on the control signal, wherein the selected rising and falling edges form the data dependent clock or are used to construct the data dependent clock.

In one example of the polar modulator, the control signal comprises an integer portion and a fractional portion.

In one example of the polar modulator, the converter further comprises a processing circuit configured to receive the determined time instances, calculate time instance differences based on the determined time instances, calculate frequencies associated with the calculated time instance differences, and generate a control signal based on the calculated frequencies. The converter also comprises a digitally controlled oscillator configured to receive the control signal and generate the data dependent clock signal based thereon.

In one example, the polar modulator further comprises a processing circuit configured to receive the interpolated digital amplitude values and process neighboring values thereof to form a single processed interpolated digital amplitude value for two determined neighboring time instances for a single 180° phase duration.

In one example, a modulator is disclosed and comprises a calculation block configured to receive a plurality of digital phase samples, wherein the plurality of digital phase samples comprise digital samples of a combined baseband and carrier phase, and determine time instances associated with predetermined phase crossings of the combined baseband and carrier phase. The modulator further comprises an interpolator circuit configured to receive a plurality of digital amplitude values and the determined time instances and generate a plurality of interpolated digital amplitude values based on the plurality of digital amplitude values of the determined time instances, wherein the interpolated digital amplitude values are synchronized with respect to the determined time instances. Still further, the modulator comprises a converter circuit configured to generate a data dependent clock signal having rising and falling edges associated with the determined time instances, and a digital to analog converter configured to receive the data dependent clock signal and the interpolated digital amplitude values or values associated therewith, and generate a square wave output signal having transition times associated with the generated data dependent clock signal and having an amplitude that is a function of the interpolated digital amplitude values or values associated therewith.

In one example of the modulator, the converter further comprises a processing circuit configured to receive the determined time instances, calculate time instance differences based on the determined time instances, and generate a control signal based on the calculated time instance differences, and a digital to time converter configured to receive the control signal and a high frequency clock signal, and select particular rising and falling edges of the high frequency clock signal based on the control signal to generate the data dependent clock signal.

In one example of the modulator, the converter further comprises a processing circuit configured to receive the determined time instances, calculate time instance differences based on the determined time instances, calculate frequencies associated with the calculated time instance differences, and generate a control signal based on the calculated frequencies, and a digitally controlled oscillator configured to receive the control signal and generate the data dependent clock signal based thereon.

In one example, the modulator further comprises a processing circuit configured to receive the interpolated digital amplitude values and process neighboring values thereof to form a single processed interpolated digital amplitude value for two determined neighboring time instances.

In one example, the modulator further comprises a processing circuit upstream of the calculation block and configured to receive the plurality of digital phase samples, predistort the plurality of digital phase samples, upsample the plurality of digital phase samples, or both.

In one example, the modulator further comprises a processing circuit upstream of the interpolator circuit and configured to receive the plurality of digital amplitude samples, predistort the plurality of digital amplitude samples, upsample the plurality of digital amplitude samples, or both.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:
1. A method, comprising:
receiving a plurality of digital samples of a modulated baseband signal, wherein the modulated baseband signal comprises a plurality of digital amplitude samples and a plurality of digital phase samples, wherein the plurality of digital phase samples comprise digital samples of a combined baseband and carrier phase;
determining time instances associated with predetermined phase crossings of the modulated baseband signal based on the plurality of digital phase samples;

generating a data dependent clock signal having rising and falling edges associated with the determined time instances;
interpolating the plurality of digital amplitude samples based on the determined time instances to generate a plurality of interpolated digital amplitude samples representing amplitude values corresponding to the predetermined phase crossings of the combined baseband and carrier phase;
providing the plurality of interpolated digital amplitude samples to a digital to analog converter; and
clocking the digital to analog converter using the generated data dependent clock signal, wherein a square wave output signal from the digital to analog converter comprises transition times associated with the generated data dependent clock signal
modulating a magnitude of the square wave based on the plurality of interpolated digital amplitude samples.

2. The method of claim 1, wherein the modulated baseband signal comprises a plurality of in-phase (I) digital samples and a plurality of quadrature (Q) digital samples.

3. The method of claim 1, further comprising:
providing the plurality of digital amplitude samples to the digital to analog converter; and
modulating a magnitude of the square wave output signal based on the plurality of digital amplitude samples.

4. The method of claim 1, wherein determining the time instances associated with the predetermined phase crossings comprises:
identifying neighboring digital samples of the combined baseband and carrier phase that straddle a predetermined phase crossing;
ascertaining time instances of a fixed digital clock signal associated with the identified neighboring samples; and
using the ascertained time instances of the digital clock to determine the time instances associated with the predetermined phase crossings.

5. The method of claim 4, wherein using the ascertained time instances of the fixed digital clock signal comprises solving a linear equation based on the ascertained time instances.

6. The method of claim 1, wherein generating the data dependent clock signal comprises:
calculating time instance differences from the determined time instances associated with the predetermined phase crossings; and
generating a control signal based on the received determined time instance differences associated with the predetermined phase crossings.

7. The method of claim 1, wherein generating the data dependent clock signal further comprises:
receiving a digital signal having a frequency substantially greater than a frequency of the data dependent clock signal; and
selectively selecting rising and falling edges of the digital signal based on the control signal, wherein the selected rising and falling edges form the data dependent clock or are used to construct the data dependent clock.

8. A modulator, comprising:
a calculation block configured to receive a plurality of digital samples of a modulated baseband signal, wherein the samples of the modulated baseband signal comprise a plurality of digital amplitude samples and a plurality of digital phase samples, and wherein the plurality of digital phase samples comprise digital samples of a combined baseband and carrier phase, and determine time instances associated with predetermined phase crossings of the modulated baseband signal using the plurality of digital phase samples;
an interpolator circuit configured to receive a plurality of digital amplitude values and the determined time instances from the calculation block and generate a plurality of interpolated digital amplitude values based on the plurality of digital amplitude values and the determined time instances;
a converter circuit configured to generate a data dependent clock signal having rising and falling edges associated with the determined time instances; and
a digital to analog converter configured to receive the data dependent clock signal and generate a square wave output signal having transition times associated with the generated data dependent clock signal.

9. The modulator of claim 8, wherein the samples of the modulated baseband signal comprise a plurality of in-phase (I) digital samples and a plurality of quadrature (Q) digital samples.

10. The modulator of claim 8, wherein the digital to analog converter is further configured to receive the plurality of digital amplitude samples and modulate a magnitude of the square wave output signal based on a value of the plurality of digital amplitude samples.

11. The modulator of claim 8, wherein the digital to analog converter is further configured to receive the plurality of interpolated digital amplitude values and modulate a magnitude of the square wave output signal based on the plurality of interpolated digital amplitude values.

12. The modulator of claim 8, wherein the calculation block is further configured to identify neighboring digital phase samples that straddle a predetermined phase crossing and determine the time instances associated with the predetermined phase crossings based on the identified neighboring digital phase samples.

13. The modulator of claim 12, wherein the calculation block is configured to determine the time instances associated with the predetermined phase crossings by ascertaining time instances of a fixed digital clock signal associated with the identified neighboring digital phase samples, and using the ascertained time instances of the fixed digital clock signal to determine the time instances associated with the predetermined phase crossings.

14. The modulator of claim 8, further comprising a phase processing circuit configured to receive the time instances associated with the predetermined phase crossings, calculate time instance differences based on the time instances, and generate a control signal based on the calculated time instance differences.

15. The modulator of claim 14, wherein the converter circuit is configured to receive a digital signal having a frequency substantially greater than a frequency of the data dependent clock signal and the control signal, and selectively select rising and falling edges of the digital signal based on the control signal, wherein the selected rising and falling edges form the data dependent clock or are used to construct the data dependent clock.

16. The modulator of claim 8, wherein the converter further comprises:
a processing circuit configured to receive the determined time instances, calculate time instance differences based on the determined time instances, calculate frequencies associated with the calculated time instance differences, and generate a control signal based on the calculated frequencies; and a digitally controlled oscillator configured to receive the control signal and generate the data dependent clock signal based thereon.

17. The modulator of claim 8, further comprising:
a processing circuit configured to receive the interpolated digital amplitude values and process neighboring values thereof to form a single processed interpolated digital amplitude value for two determined neighboring time instances for a single 180° phase duration.

18. A modulator, comprising:
a calculation block configured to receive a plurality of digital phase samples, wherein the plurality of digital phase samples comprise digital samples of a combined baseband and carrier phase, and determine time instances associated with predetermined phase crossings of the combined baseband and carrier phase;
an interpolator circuit configured to receive a plurality of digital amplitude values and the determined time instances and generate a plurality of interpolated digital amplitude values based on the plurality of digital amplitude values and the determined time instances, wherein the interpolated digital amplitude values are synchronized with respect to the determined time instances;
a converter circuit configured to generate a data dependent clock signal having rising and falling edges associated with the determined time instances; and
a digital to analog converter configured to receive the data dependent clock signal and the interpolated digital amplitude values or values associated therewith, and generate a square wave output signal having transition times associated with the generated data dependent clock signal and having an amplitude that is a function of the interpolated digital amplitude values or values associated therewith.

19. The modulator of claim 18, wherein the converter further comprises:
a processing circuit configured to receive the determined time instances, calculate time instance differences based on the determined time instances, and generate a control signal based on the calculated time instance differences; and
a digital to time converter configured to receive the control signal and a high frequency clock signal, and select particular rising and falling edges of the high frequency clock signal based on the control signal to generate the data dependent clock signal.

20. The modulator of claim 18, wherein the converter further comprises:
a processing circuit configured to receive the determined time instances, calculate time instance differences based on the determined time instances, calculate frequencies associated with the calculated time instance differences, and generate a control signal based on the calculated frequencies; and
a digitally controlled oscillator configured to receive the control signal and generate the data dependent clock signal based thereon.

21. The modulator of claim 18, further comprising:
a processing circuit configured to receive the interpolated digital amplitude values and process neighboring values thereof to form a single processed interpolated digital amplitude value for two determined neighboring time instances.

* * * * *